US012305831B2

(12) United States Patent
Huang et al.

(10) Patent No.: US 12,305,831 B2
(45) Date of Patent: May 20, 2025

(54) LIGHTING FIXTURE WITH THREADLESS FIT

(71) Applicant: HANGZHOU HPWINNER OPTO CORPORATION, Hangzhou (CN)

(72) Inventors: Jianming Huang, Hangzhou (CN); Kai Chen, Hangzhou (CN); Ming Xu, Hangzhou (CN); Mingzhi Gao, Hangzhou (CN); Takeshi Takano, Tokyo (JP)

(73) Assignee: HANGZHOU HPWINNER OPTO CORPORATION, Hangzhou (CN)

( * ) Notice: Subject to any disclaimer, the term of this patent is extended or adjusted under 35 U.S.C. 154(b) by 0 days.

(21) Appl. No.: 18/232,335

(22) Filed: Aug. 9, 2023

(65) Prior Publication Data

US 2024/0117957 A1 Apr. 11, 2024

(30) Foreign Application Priority Data

Oct. 9, 2022 (CN) ......................... 202222655426.3
Mar. 3, 2023 (CN) ......................... 202320375461.1
Mar. 3, 2023 (JP) .................................. 2023000651

(51) Int. Cl.
*F21V 17/16* (2006.01)
*F21V 31/00* (2006.01)

(52) U.S. Cl.
CPC .......... *F21V 17/164* (2013.01); *F21V 31/005* (2013.01)

(58) Field of Classification Search
CPC .... F21V 17/164; F21V 31/005; F21V 17/104; F21V 17/16
See application file for complete search history.

(56) References Cited

U.S. PATENT DOCUMENTS 5,001,610 A * 3/1991 Otaka ..................... F21S 43/26 362/543
6,024,474 A * 2/2000 Tanaka ................. B60Q 1/2607 362/543
9,752,749 B2 * 9/2017 Adams ................. B60Q 1/0483
2011/0194279 A1 * 8/2011 Kuo ........................ F21S 2/005 362/326
2011/0194287 A1 * 8/2011 Georgitsis ............... F21V 14/02 362/277
2012/0188766 A1 * 7/2012 Lu ......................... F21V 17/005 362/249.02

(Continued)

FOREIGN PATENT DOCUMENTS

CN 111322528 A * 6/2020
EP 3527888 A1 * 8/2019 ............ F21V 17/164

*Primary Examiner* — Alexander K Garlen
(74) *Attorney, Agent, or Firm* — IPro, PLLC

(57) ABSTRACT

Disclosed herein is a lighting fixture in which a threadless fit is achieved between a lens cover and a housing. The lighting fixture comprises a housing, a circuit board and a lens cover. The housing and the lens cover are arranged on opposite sides of the circuit board. The housing comprises a first slot. The lens cover comprises a first tab configured to fit into the first slot by a threadless fit, thereby securing the lens cover to the housing. Compared with lighting fixtures in the prior art, the lighting fixture of the present disclosure can save process steps, simplify manufacturing process, reduce manufacturing cost, and improve heat dissipation and light distribution efficiency.

24 Claims, 18 Drawing Sheets

(56) References Cited

U.S. PATENT DOCUMENTS

| | | | | |
|---|---|---|---|---|
| 2013/0088871 | A1* | 4/2013 | Yun | F21V 17/164<br>362/373 |
| 2014/0268788 | A1* | 9/2014 | Boyer | F21S 8/06<br>362/267 |
| 2016/0327237 | A1* | 11/2016 | Hoch | F21V 23/009 |
| 2022/0299197 | A1* | 9/2022 | Henrici | G02B 19/0028 |

* cited by examiner

LIGHTING FIXTURE WITH THREADLESS FIT

TECHNICAL FIELD

The present disclosure relates generally to the technical field of illumination, and in particular to a lighting fixture in which a threadless fit is achieved between a lens cover and a housing.

BACKGROUND

Various lamps such as fluorescent lamps, high-intensity discharge (HID) lamps, LED lamps, and incandescent bulbs play a crucial role in providing illumination for residential and commercial buildings and industrial facilities such as manufacturing plants, warehouses, and factories. At present, most lamps adopt a screw fit (also known as threaded fit) between lens covers and lamp housings. The screw fit may be responsible for the following problem: (i) installing the lens covers to or removing the lens covers from the lamp housings may be time-consuming; (ii) there is a risk of damaging the lens covers or lamp housings if the screw fit is not executed properly; (iii) when used in a harsh environment or exposed to vibrations, screws may deform or warp, which makes circuit boards between the lens covers and the lamp housings unable to tightly attach to the housings and the lens covers, affecting heat dissipation and light distribution.

SUMMARY

Discloses herein is a lighting fixture that comprises a housing, a circuit board and a lens cover. The housing and the lens cover are arranged on opposite sides of the circuit board; the housing comprises a first slot; the lens cover comprises a first tab configured to fit into the first slot by a threadless fit, thereby securing the lens cover to the housing.

In an exemplary embodiment, the threadless fit may be an interference fit.

In an exemplary embodiment, the threadless fit may be a snap fit.

In an exemplary embodiment, the housing may further comprise a second slot, and the lens cover may further comprise a second tab configured to fit into the second slot by a threadless fit.

In an exemplary embodiment, the first tab may comprise a groove with an opening toward a bottom of the first slot.

In an exemplary embodiment, an opening of the first slot may have a greater width than a bottom of the first slot.

In an exemplary embodiment, the lighting fixture may further comprise a first sealant in the first slot.

In an exemplary embodiment, the lighting fixture of claim may further comprise a first groove defined by an outer sidewall of the first tab and an outer sidewall of the first slot, with a second sealant in the first groove.

In an exemplary embodiment, the first sealant may be different from the second sealant.

In an exemplary embodiment, the first sealant may have a higher viscosity than the second sealant.

In an exemplary embodiment, the first tab may have a first taper, and the first slot may have a second taper greater than the first taper.

In an exemplary embodiment, the housing may further comprise a third slot between the first slot and the second slot, and the lens cover may further comprise a third tab configured to fit into the third slot by an interference fit or a snap fit, thereby securing the lens cover to the housing.

In an exemplary embodiment, the lens cover may comprise one or more positioning columns, the housing may comprise one or more positioning holes, and the positioning columns may be configured to position the lens cover relative to the housing by fitting into the positioning holes.

In an exemplary embodiment, the first tab may have an asymmetrical taper.

In an exemplary embodiment, the first tab may comprise a groove with an opening toward an opening of the first slot.

In an exemplary embodiment, the first tab may be corrugated, with ridges on an outer sidewall and troughs on an inner sidewall of the first tab, and the ridges can engage the first slot.

In an exemplary embodiment, the first tab may comprise a protrusion on an outer sidewall of the first tab, and the protrusion may engage the slot.

In an exemplary embodiment, the first tab may comprise a plurality of clamping slots, the first slot may comprise a plurality of clamping blocks, and the plurality of clamping slots can engage the plurality of clamping blocks, thereby forming an interference fit.

In an exemplary embodiment, the first tab may comprise a plurality of gaps.

In an exemplary embodiment, the first tab may comprise a plurality of sections, and the plurality of gaps and the plurality of sections can be alternately arranged.

In an exemplary embodiment, the first tab may comprise a hook, the first slot may comprise a buckle groove in a sidewall of the first slot, and the hook can engage the buckle groove, thereby forming a snap fit.

In an exemplary embodiment, the lens cover may comprise a plurality of lenses.

In an exemplary embodiment, the circuit board may comprise light emitters arranged in an array.

In an exemplary embodiment, the housing may comprise a heat sink.

In an exemplary embodiment, each of the plurality of lenses may cover a predetermined number of light emitters in the circuit board and be configured to direct light emitted from the light emitters out of the lighting fixture.

DETAILED DESCRIPTION

In order to better understand the present disclosure, various aspects of the present disclosure will be described in more detail with reference to the drawings. It should be understood that the detailed description is merely description of exemplary implementations of the present disclosure and does not limit the scope of the present disclosure in any way.

It should be noted that in the present description, the expressions of "first", "second", "third", etc. are only used to distinguish one feature from another feature, and do not indicate any limitation on the features.

In order to facilitate an understanding of the present disclosure, a number of terms will be briefly introduced below before the description of specific embodiments.

As used herein and in the appended claims, the term "screw fit" (also known as threaded fit) refers to a connection in which a threaded connector (e.g., a screw or a bolt) is used to connect two components, one having a hole or boss, and the other having threads. The threaded connector is inserted into the hole or boss, and then tightened to create a secure and tight connection.

As used herein and in the appended claims, the term "threadless fit" refers to a connection between two components without the use of a threaded connector. Examples of the threadless fits include but are not limited to a snap fit and an interference fit.

As used herein and in the appended claims, the term "interference fit" (also known as press fit or friction fit) refers to a connection between two components by compressive force created due to an interference therebetween, by pressing one component into a hole or cavity of the other component. Specifically, when the two components are pressed together, a small amount of elastic deformation occurs in both components, creating a frictional force that holds the components together and thereby providing a secure connection.

Specific embodiments according to the present disclosure will now be described in detail with reference to the accompanying drawings. Like elements in various figures are denoted by like reference signs for consistency.

First Embodiment

A lighting fixture 100 according to this embodiment is shown in FIGS. 1-7. The lighting fixture 100 may be used as a botanical lamp for plant lighting or may be used as a wall wash lamp. The lighting fixture 100 may be used as other lamps for providing illumination in other scenarios.

Figure 1:
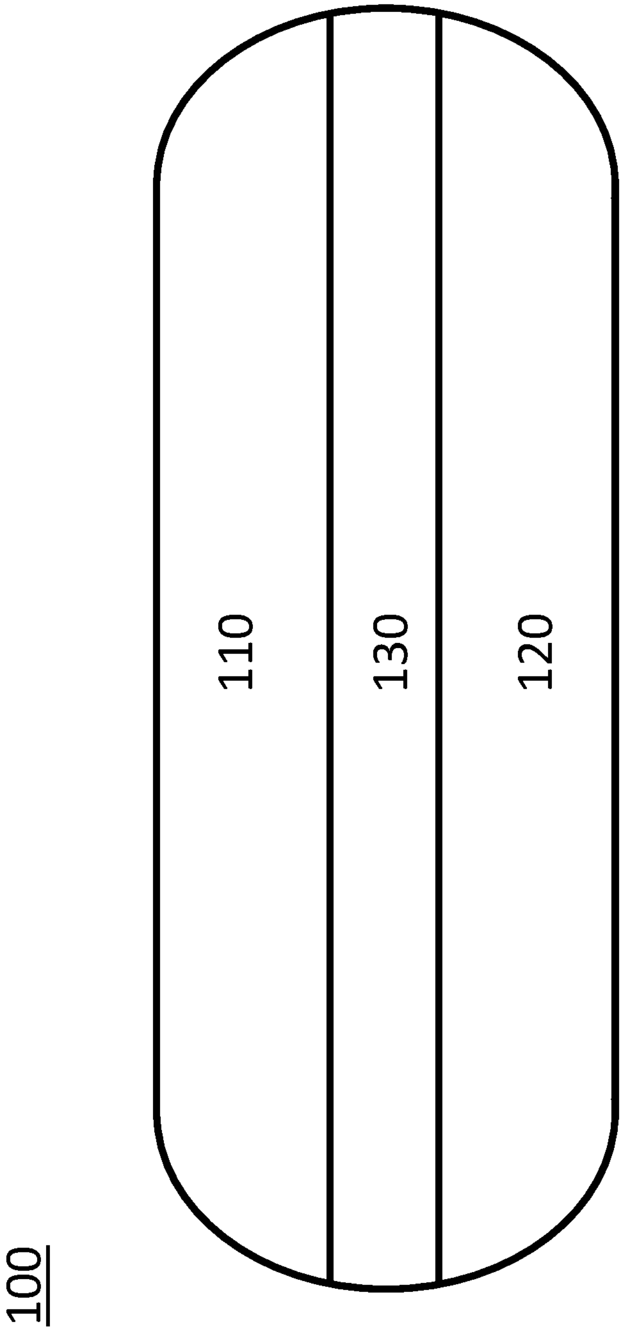
FIG. 1 shows a structural schematic diagram of a lighting fixture according to a first embodiment.

As shown in FIG. 1, an overall structure of the lighting fixture 100 includes a housing 120, a circuit board 130 and a lens cover 110, which are sequentially stacked. That is, the housing 120 and the lens cover 110 are arranged on opposite sides of the circuit board 130. The housing 120 accommodates and protects the circuit board 130, and the lens cover 110 covers light emitters on the circuit board 130 and directs light emitted from the light emitters out of the lighting fixture 100. In an implementation of this embodiment, the housing 120 may also functions as a heat sink. The heat sink is used to dissipate heat generated in the lighting fixture 100, thereby preventing overheating and damage from overheating. In another implementation, there may be a separate heat sink attached to the housing 120. The housing 120 may be made of metal, plastic, glass, ceramic or other suitable materials. The material of the housing 120 may be specifically chosen depending on an intended application and design requirements, including heat dissipation, durability, weight, cost and aesthetics.

Figure 2:
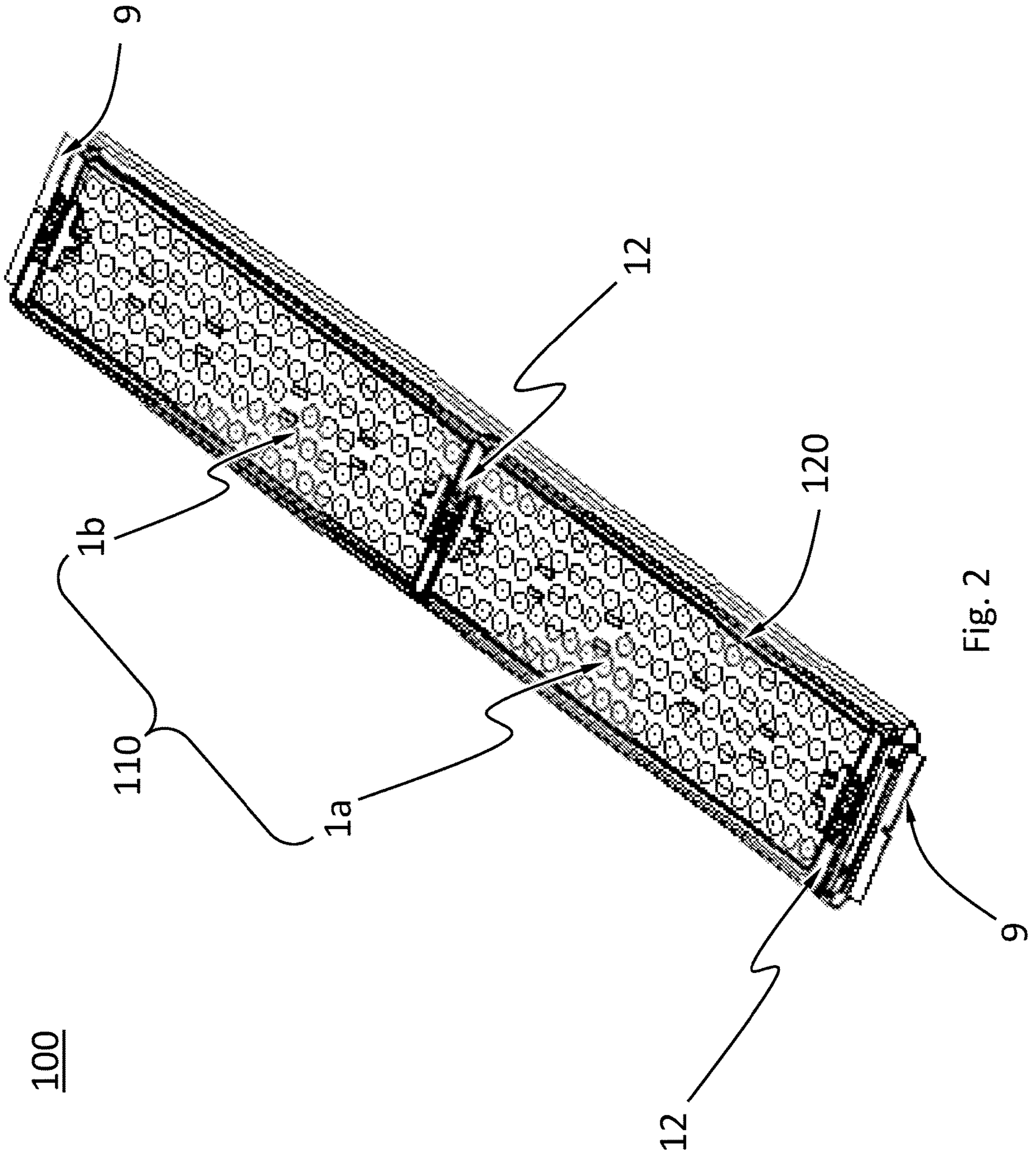
FIG. 2 shows a perspective view of the lighting fixture according to the first embodiment.
Figure 3:
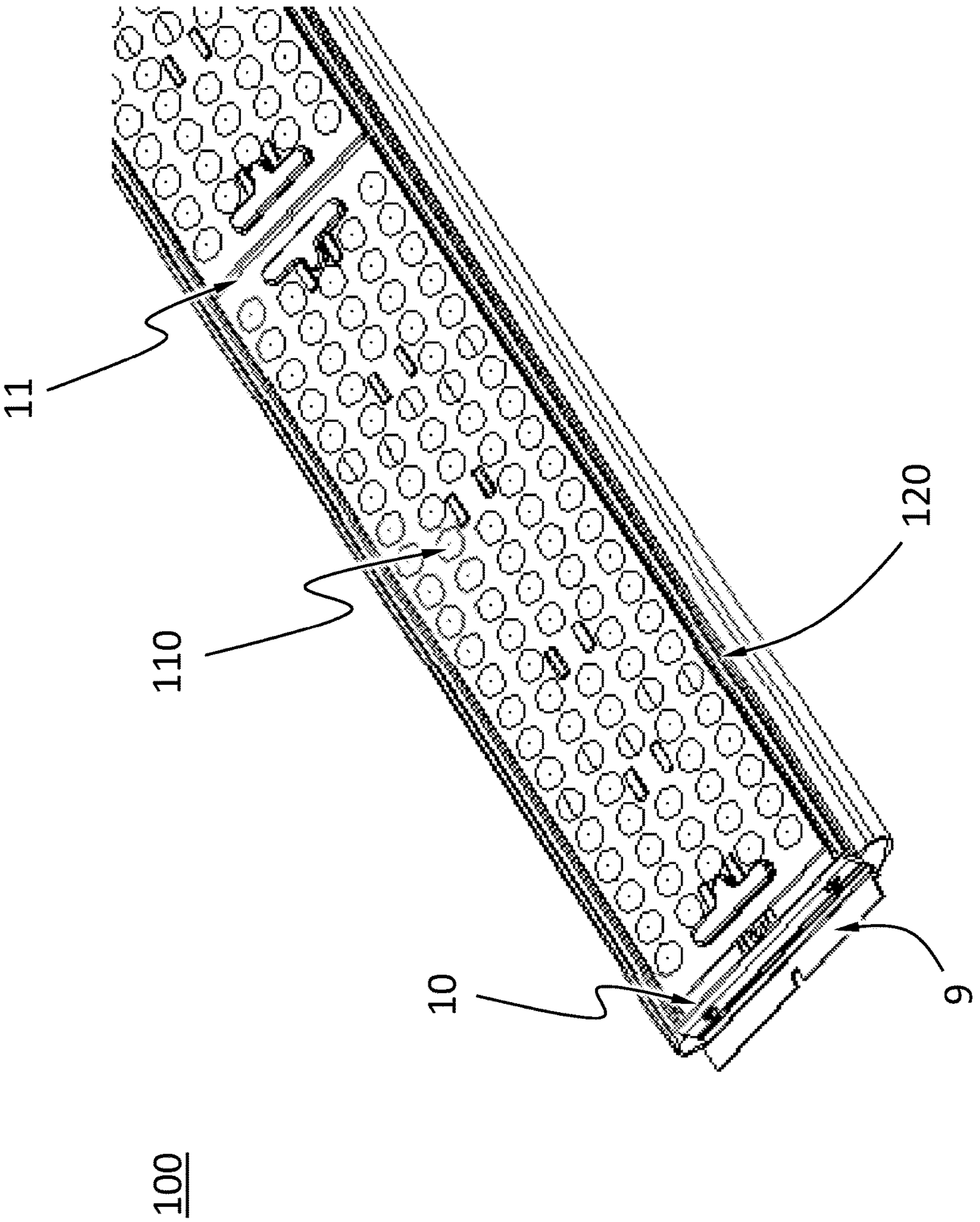
FIG. 3 shows an enlarged perspective view of a part of the lighting fixture of FIG. 2.

FIGS. 2 and 3 show perspective views of the lighting fixture 100. As shown in FIGS. 2 and 3, the lens cover 110 comprises lenses 1_a_ and 1_b_, and each lens covers a predetermined number of light emitters arranged in an array on the circuit board 130. The lens cover 110 may also have three or more lenses based on needs. The lenses of the lens cover 110 may be arranged in a row, an array or any suitable patterns. In this embodiment, the lenses may each cover the same number of light emitters so that the whole lighting fixture is more aesthetic but may also cover different numbers of light emitters. Moreover, the specific number of light emitters covered by each lens is not limited in this embodiment. In other words, each lens may cover only one light emitter, but it may also cover two or more light emitters. In addition, in this embodiment, each of the light emitters may be any type of light emitter such as a light-emitting diode (LED), a laser diode, a fluorescent light or a neon light. Each of the lenses may be made of plastic such as polycarbonate or acrylic. The lenses are preferably made of polycarbonate due to its excellent optical properties, high impact resistance, and light weight. The circuit board 130 may be any type of circuit board. For example, the circuit board 130 may be a printed circuit board (PCB), which may be rigid or flexible. The circuit board 130 may include a driver circuit for controlling a voltage and a current to the light emitters.

Further referring to FIGS. 2 and 3, the housing 120 may further include support frames 9 at both ends in a length direction of the housing 120. The support frames 9 are used to provide mounting or attachment points for the housing 120, making it easier to install and secure the lighting fixture 100 in its intended location. There is a first gap 10 between each support frame and one end of the lens close to the support frame, and there is a second gap 11 between two lenses 1_a_ and 1_b_. The first gap 10 and the second gap 11 may each be covered with a snap fastener 12, which improves the appearance of the lighting fixture 100 and further securing the lens cover 110 to the housing 120. One or both of the first gap 10 and the second gap 11 may be filled with a sealant. Examples of the sealant include, but are not limited to, silicone, epoxy resin, and polyurethane.

Figure 4:
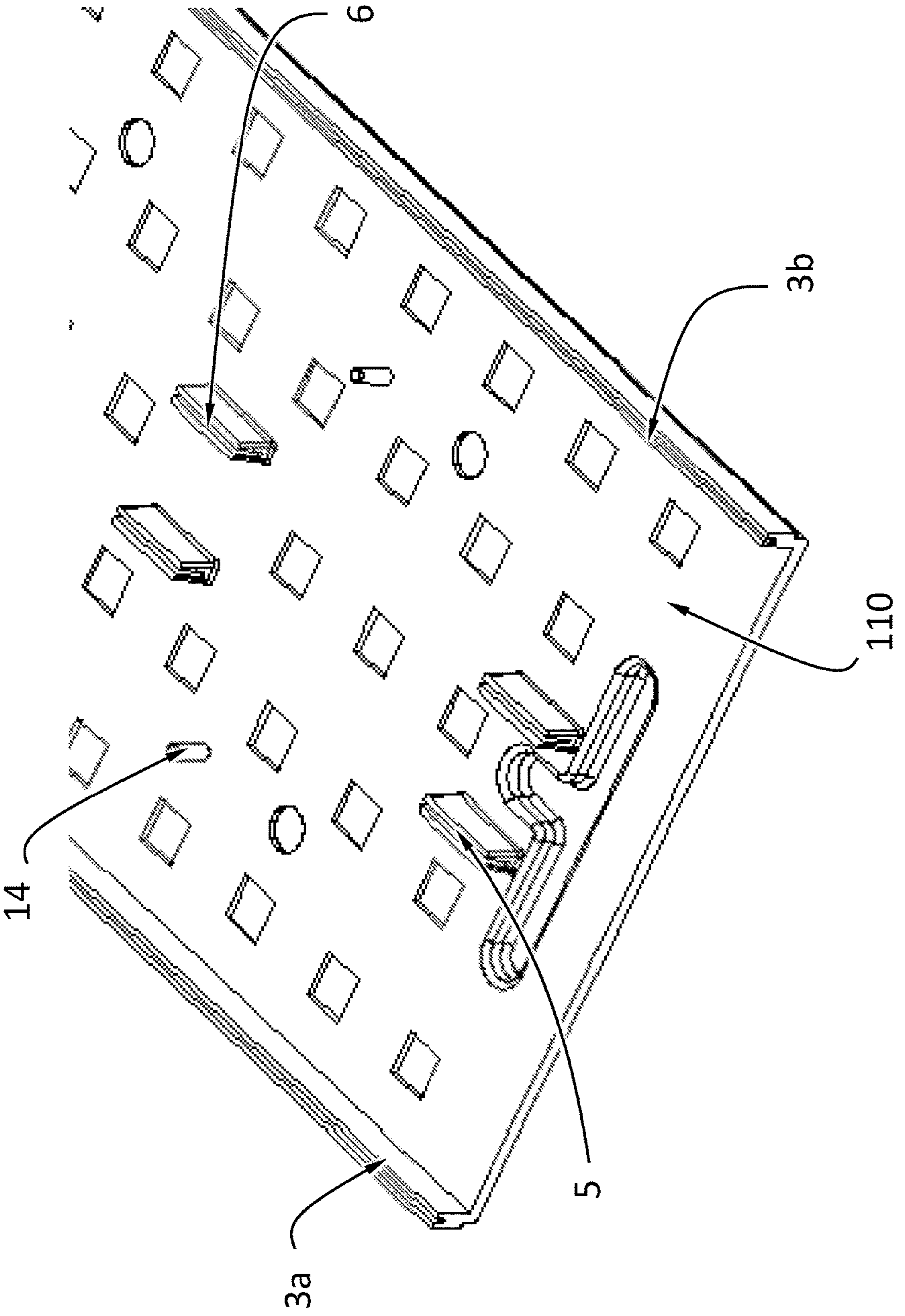
FIG. 4 shows a partial perspective view of a lens cover of the lighting fixture of FIG. 2.
Figure 5:
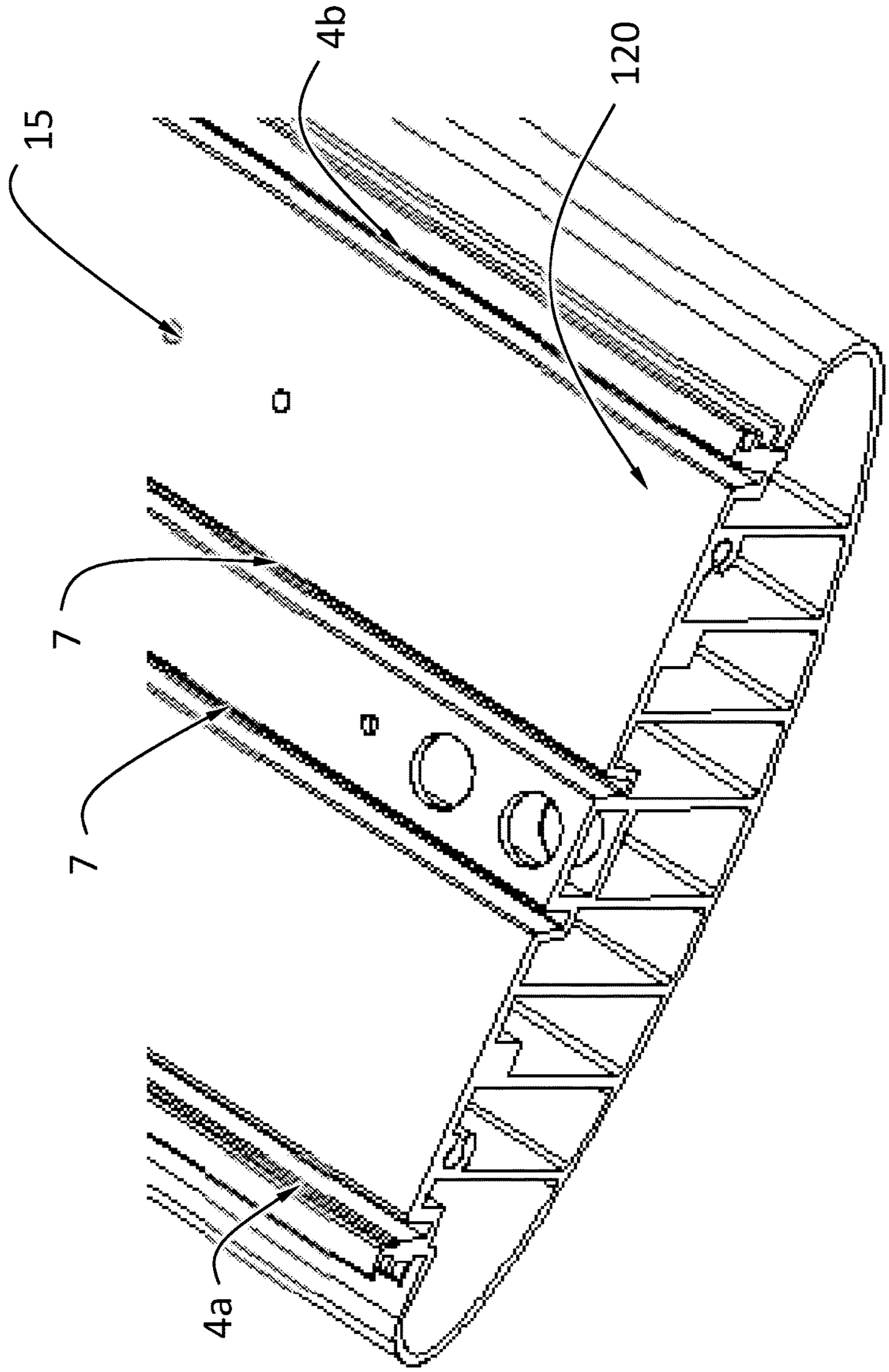
FIG. 5 shows a partial perspective view of a housing of the lighting fixture of FIG. 2.

Referring to FIGS. 4 and 5, two tabs 3_a_ and 3_b_ are provided on opposite sides of the lens cover 110, and two slots 4_a_ and 4_b_ are correspondingly provided on opposite sides of the housing 120, so that an interference fit between the lens cover 110 and the housing 120 can be formed when the tabs 3_a_ and 3_b_ are respectively inserted into the slots 4_a_ and 4_b_, respectively. The two tabs 3_a_ and 3_b_ may or may not have the same structure, and the two slots 4_a_ and 4_b_ may or may not have the same structure. One tab and one slot will be only described below to avoid redundancy, and in the subsequent description and figures, the tab and the slot are denoted by 3 and 4, respectively. Although FIGS. 4 and 5 show two tabs and two slots, it is possible to have one tab and one slot.

Figure 6:
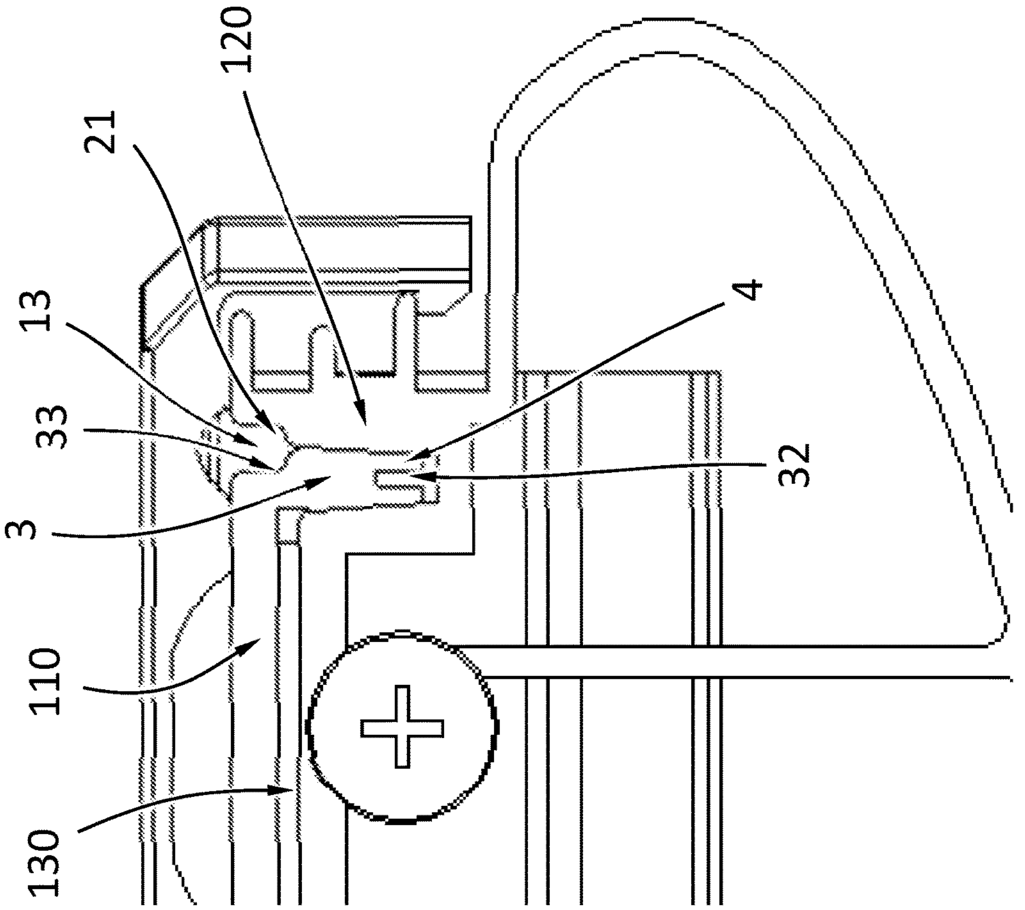
FIG. 6 shows a partial cross-sectional view of the lighting fixture of FIG. 2.

As shown in FIG. 6, the slot 4 has an opening facing the lens cover 110, and the opening has a greater width than the bottom of the slot 4, which makes it easier to insert the tab 3 into the slot 4. An end of the tab 3 proximal to the bottom of the slot 4 may have a groove 32. The groove 32 has an opening toward the bottom of the slot 4. During the process of inserting the tab 3 into the slot 4, both sides of the tab 3 may be bent toward the groove 32 due to the force exerted by the walls of the slot 4.

In this embodiment, the tab 3 may have a first taper on its sidewalls, the slot 4 may have a second taper on its sidewalls, and the second taper is greater than the first taper. In a specific implementation, a sidewall of the tab 3 may have a first inclination angle θ1 relative to a depth direction of the slot 4, and a sidewall of the slot 4 may have a second inclination angle θ2 relative to the depth direction of the slot 4. The first inclination angle θ1 may be smaller than the second inclination angle θ2, which allows the tab 3 to gradually approach the slot 4 during the process of inserting the tab 3 into the slot 4 until a reliable interference fit is formed. Here, θ1 may be preferably set to 1°, and θ2 may be preferably set to 3°. When the values of θ1 and θ2 are too small, it will be difficult to form a sufficient amount of interference between the tab 3 and the slot 4. On the contrary, when the values of θ1 and θ2 are too large, the outward component force of the elastic force generated by the interference will be too large, which reduces the stability of the connection between the lens cover 110 and the housing 120. The values of θ1 and θ2 should not be limited to the preferred values mentioned above.

Continuing to refer to FIG. 6, an end of the tab 3 proximal to the top of the slot 4 may have a first recessed portion 33, and an inner sidewall of the top of the slot 4 may have a second recessed portion 21. When the tab 3 is inserted into the slot 4, the first recessed portion 33 is directly opposite to the second recessed portion to form a groove 13. In a specific implementation, the bottom of the slot 4 may be filled with a first sealant before the tab 3 is inserted into the slot 4, and the groove 13 may be filled with a second sealant after the tab 3 is inserted into the slot 4. Examples of the first sealant and the second sealant include, but are not limited to, silicone, epoxy resin, and polyurethane. The first sealant may have a higher viscosity than the second sealant. It is also possible in some applications that the first sealant and the second sealant are the same material. The first sealant can seal and fix the tab 3. The second sealant can fill any gap between the tab 3 and the slot 4. The first sealant together with the second sealant may not only stabilize the connection between the lens cover 110 and the housing 120, but also facilitate automatic production of the lighting fixture 100 so that the production efficiency thereof may be improved. In this embodiment, there is not a sealing ring (e.g., an O-ring), which further facilitates automatic production of the lighting fixture 100 and allows the light-emitting area of the lighting fixture 100 to be larger. It is also possible to only fill the first sealant into the slot 4 or only fill the second sealant into the groove 13, or not fill the slot 4 and the groove 13 with any sealant.

The housing 120 may further have at least one slot 7 (e.g., two slots shown in FIG. 5) extending along the length direction of the housing 120 between the slots 4*a* and 4*b*. The lens cover 110 may further have an insert (which may also be called a tab) that can fit into the at least one slot 7. In a specific example, the insert may include a first insert piece 5 and a second insert piece 6. The first insert piece 5 is located at both ends of the lens cover 110, and the second insert piece 6 is located in a light-emitting region of the lighting fixture 100. Namely, the second insert piece 6 may be located among the light emitters on the circuit board 130 when the lens cover 110 is installed to the housing 120. The first insert piece 5 and the second insert piece 6 can be inserted into the slot 7 to achieve an interference fit or a snap fit between the insert pieces and the slot 7, thereby securing the lens cover 110 to the housing 120. For example, when the insert piece 5 or 6 has a protrusion that can snap into the slot 7, the snap fit between the insert piece 5 or 6 and the slot 7 may be achieved. A specific structure of the insert piece 5 or 6 that can achieve the interference fit with the slot 7 will be described later with reference to FIG. 7. The number of the first insert pieces 5 at both ends of the lens cover 110 may be the same as the number of the slots 7, and the first insert pieces 5 and the slots 7 correspond to each other. The first insert pieces 5 cooperate with the tabs 3*a* and 3*b* to realize the peripheral interference of the lens cover 110 with the housing 120 for sealing and fixing. After the insert pieces are inserted in place, the downward (i.e., into the depth of the slot 7) friction force generated by the interference fit of the second insert piece 6 makes the lens cover 110 be close to the circuit board 130, and further makes the lens cover 110 press the circuit board 130 onto the housing 120, which may reduce bulging and separation between the lens cover 110 and the circuit board 130. The lens cover 110 may also improve the thermal contact between the circuit board 130 to the housing 120.

Figure 7:
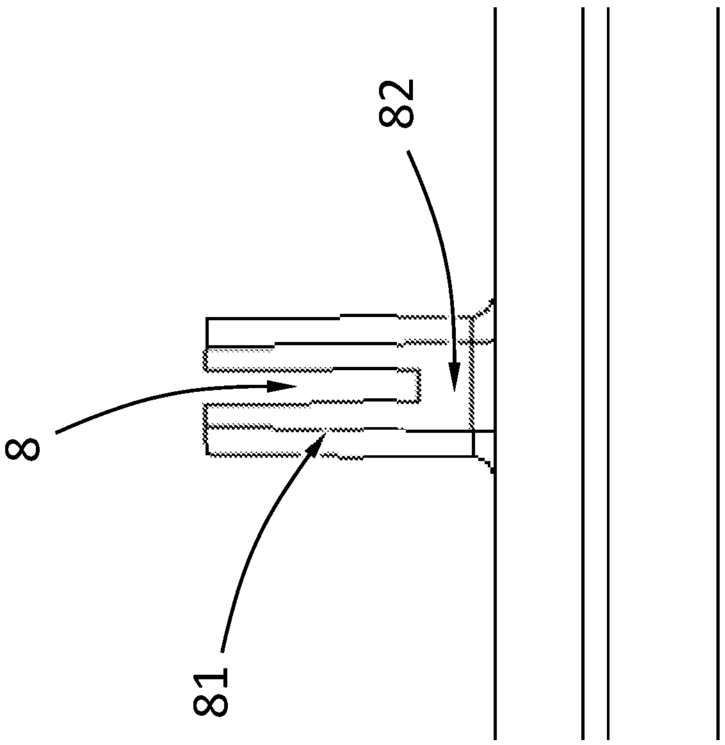
FIG. 7 shows a cross-sectional view of an insert piece on the lens cover of FIG. 4.

The bottom of each of the first insert piece 5 and the second insert piece 6 may have a groove 8 as shown in FIG. 7, because the groove 8 provides a space the insert piece 5 or 6 can deform into when inserted into the slot 7. The groove 8 may have a depth smaller than a height of the insert piece 5 or 6, so that an end of the insert piece 5 or 6 joining the rest of the lens cover 110 has a part not separated by the groove 8. The groove 8 may have a depth of greater than or equal to 2 mm, and a width of greater than or equal to 0.7 mm. As shown in FIG. 7, in a height direction, the insert piece 5 or 6 is divided into a deformation portion 81 corresponding to sidewalls of the groove 8, and an interference portion 82 located below the bottom of the groove 8. The deformation portion 81 has a relatively small rigidity due to the presence of the groove 8. When the insert piece 5 or 6 is inserted into the slot 7, the deformation portion 81 will deform into the groove 8, so as to increase the insertion depth of the insert piece 5 or 6 into the slot 7. The interference portion 82 has a solid structure and has a relatively high rigidity. When the insert piece 5 or 6 is inserted into the slot 7, the interference portion 82 will form an interference fit with a sidewall of the slot 7, so that a frictional force against deformation can be created between the lens cover 110 and the housing 120. Therefore, the interference portion 82 provides an interference amount capable of generating friction force against deformation between the lens cover 110 and the housing 120.

In another specific implementation of this embodiment, the lens cover 110 may further have at least one positioning column 14, and the housing 120 may further have at least one positioning hole 15 that can fit the at least one positioning column 14. When the lens cover 110 and the housing 120 are assembled, the positioning column 14 is inserted into the positioning hole 15, so that the lens cover 110 can be positioned in its length direction through the cooperation of the positioning column 14 and the positioning hole 15.

As described above, in the lighting fixture 100 of this embodiment, the connection between the lens cover 110 and the housing 120 adopts the interference fit, so that the assembly of the lighting fixture may be simplified. The interference fit can be formed during manufacturing the housing 120 and the lens cover 110, without the need for tapping screw holes and sealing the screw holes. Multiple seals at the connection between the lens cover 110 and the housing 120 improves the protection of the lighting fixture 100 and prevents or reduces water ingress. The interference fit between the insert pieces 5 or 6 and the slots 7 is combined with the interference fit between the peripheral sides (formed by the tab 3 and the slot 4) of the lens cover 110 and the housing 120 to allow the lens cover 110 to be pressed onto the housing 120 as a whole, and to allow the entire bottom of the lens cover 110 to uniformly act on the circuit board 130, so that the circuit board 130 are in close contact with the lens cover 110 and the housing 120. The large and tight contact between the circuit board 130 and the housing 120 improves heat dissipation. The close contact between the lens cover 110 and the circuit board 130 allows more accurate light distribution and higher light output.

Variation of the First Embodiment

Figure 8:
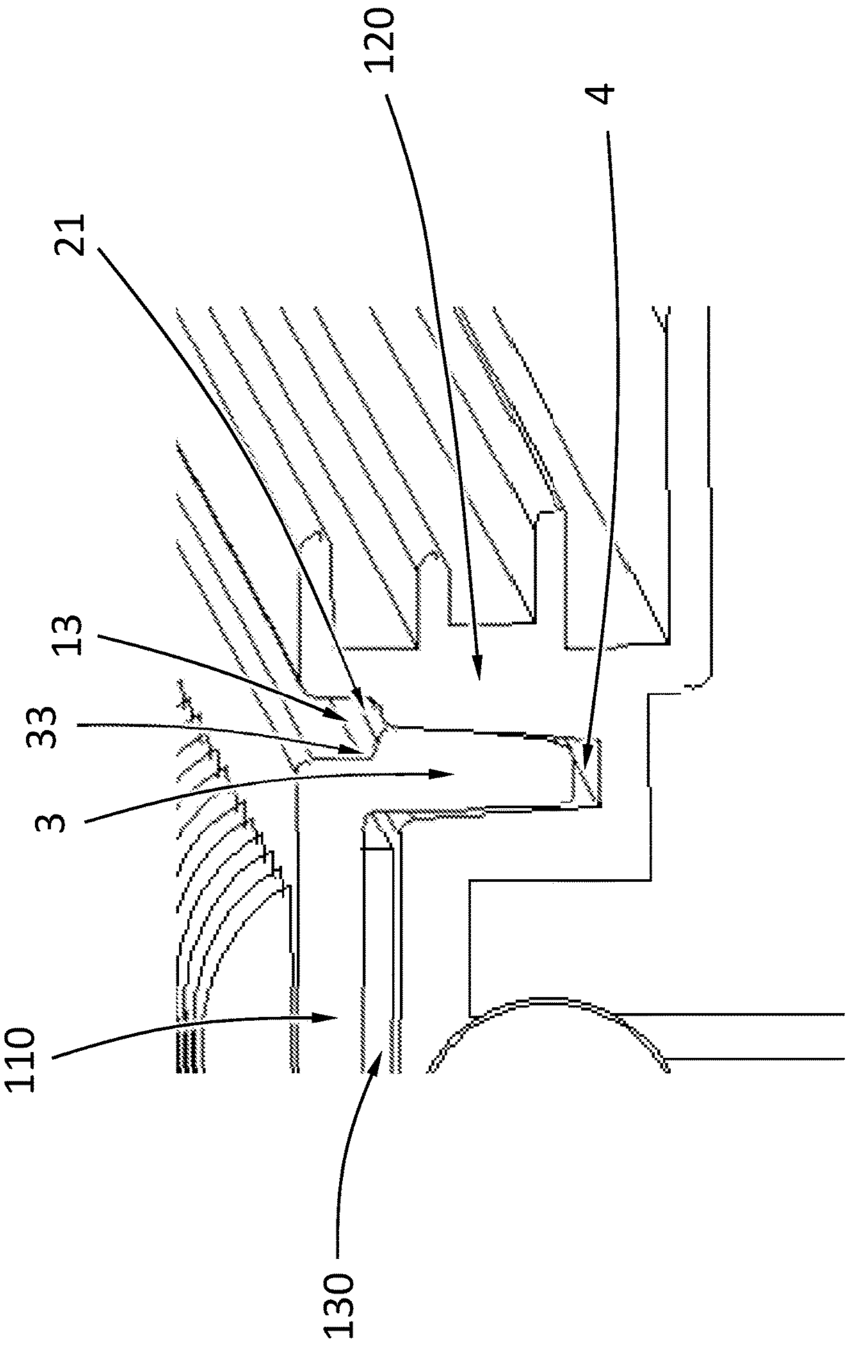
FIG. 8 shows a partial perspective view of a lighting fixture according to a variation of the first embodiment.

In a variation of the first embodiment, the end of the tab 3 proximal to the bottom of the slot 4 may have no groove 32, as shown in FIG. 8. In this modification, an inner side of the tab 3 may be configured to be unilaterally squeezed when it is inserted to the slot 4, so as to create an interference fit with the slot 4. It is also possible that an outer side of the tab 3 is unilaterally squeezed to create the interference fit with the slot 4; or both sides of the tab 3 are squeezed to create the interference fit with the slot 4. In other words, the tab 3 may have a symmetrical or asymmetrical taper for achieving a unilateral or bilateral interference fit with the slot 4. For the unilateral interference fit, the amount of interference is preferably above 0.3 mm, and for the bilateral interference fit, the amount of interference is preferably above 0.1 mm.

Second Embodiment

The lighting fixture 100 of this embodiment substantially has the same structure as the lighting fixture 100 of the first embodiment except for the tab 3. In this embodiment, the same parts as those in the first embodiment are denoted by the same reference numerals, and the description thereof is not repeated.

Figure 9:
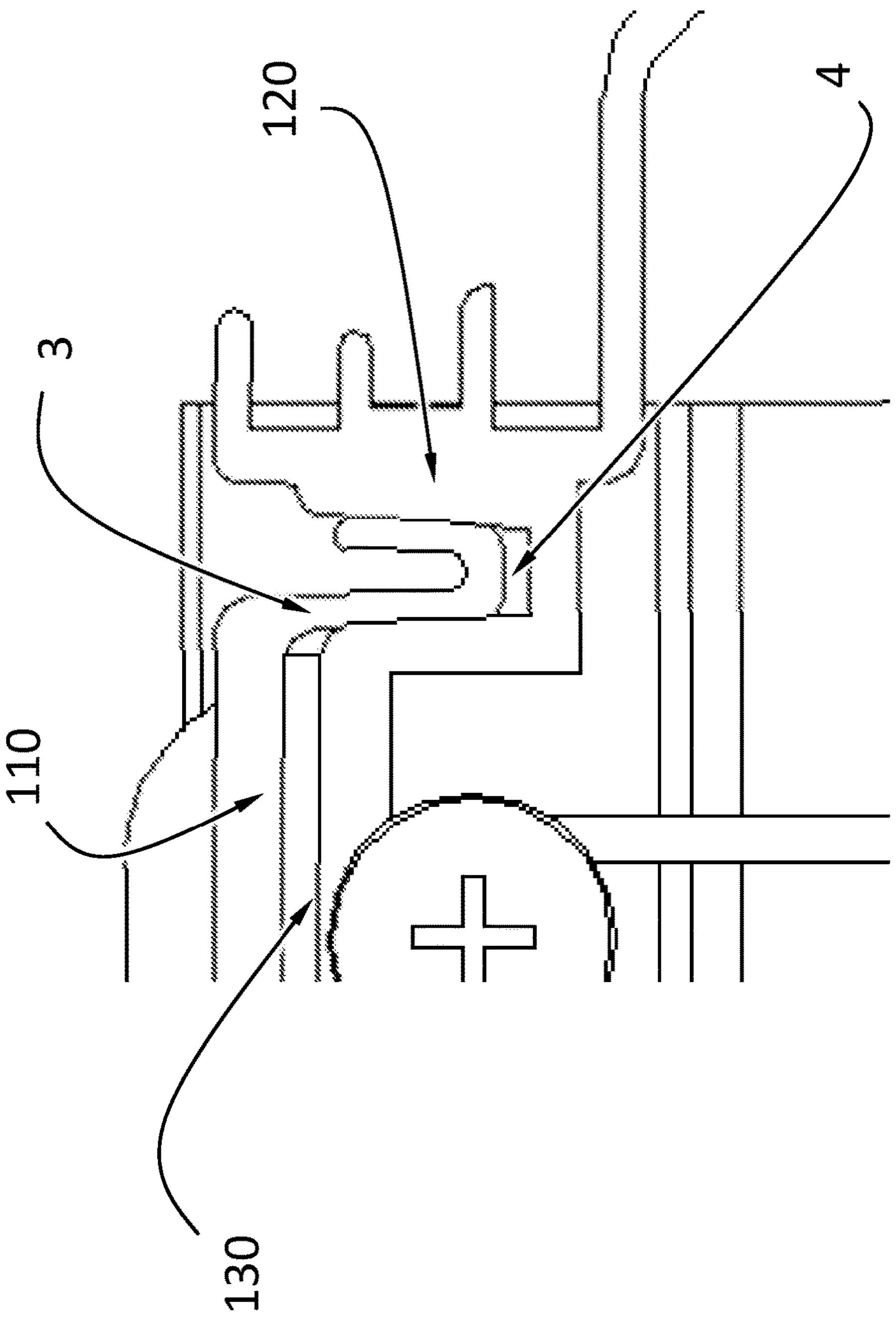
FIG. 9 shows a partial cross-sectional view of a lighting fixture according to a second embodiment.

In this embodiment, the tab 3 of the lens cover 110 has a U-shaped groove structure, as shown in FIG. 9. When the tab 3 is inserted into the slot 4, an inner sidewall of the U-shaped groove of the tab 3 and an inner sidewall of the slot 4 squeeze each other, and an outer sidewall of the U-shaped groove of the tab 3 and an outer sidewall of the slot 4 squeeze each other, so as to realize an interference fit between the tab 3 and the slot 4, thereby securing the lens cover 110 to the housing 120. That is, during the process of inserting the tab 3 into the slot 4, the bilateral interference fit is generated between the tab 3 and the slot 4, so that the compressive force is distributed evenly, resulting in strong resistance to vibration and shock and reducing the likelihood of damage.

Third Embodiment

The lighting fixture 100 of this embodiment substantially has the same structure as the lighting fixture 100 of the first embodiment except for the tab 3. In this embodiment, the same parts as those in the first embodiment are denoted by the same reference numerals, and the description thereof is not repeated.

Figure 10:
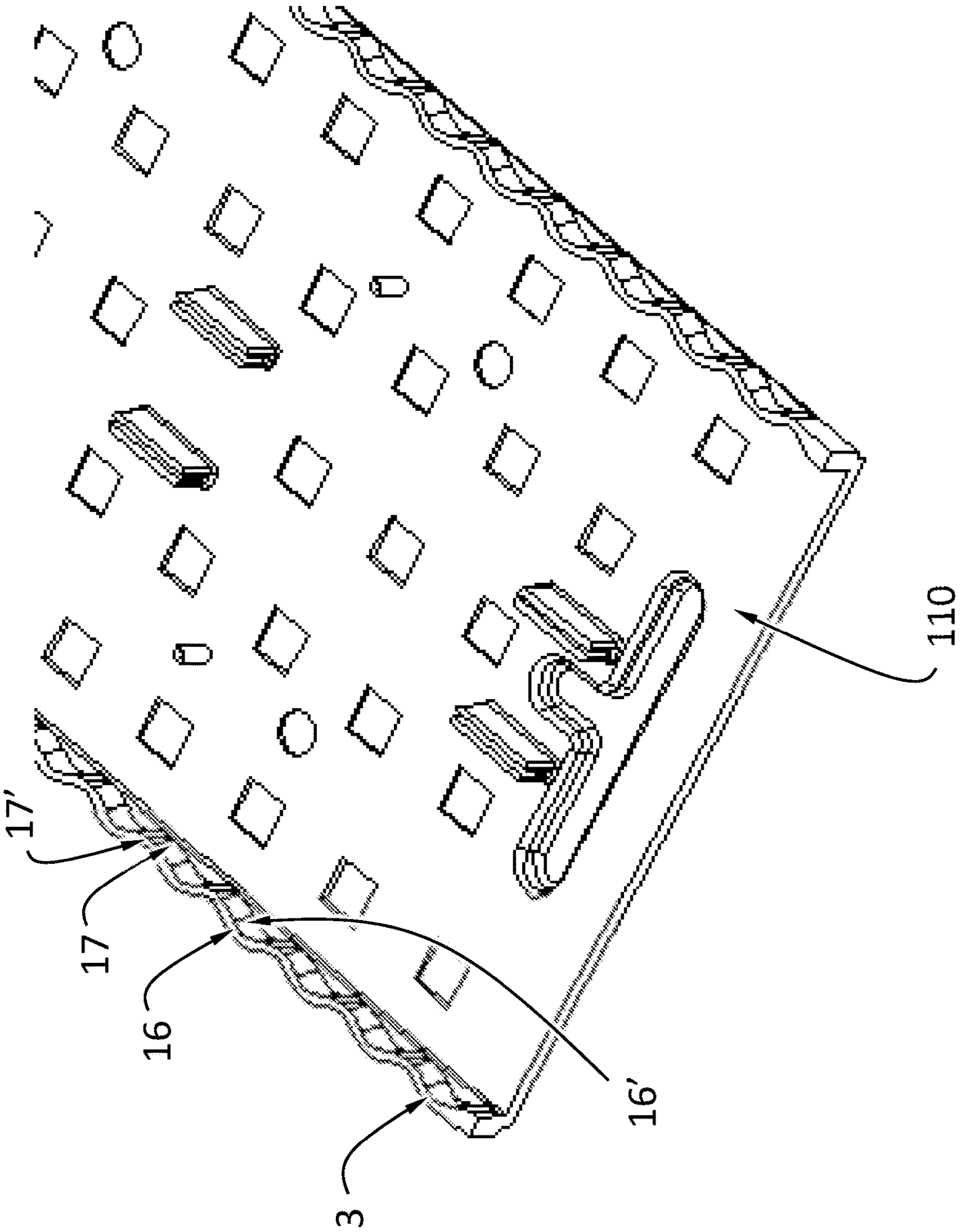
FIG. 10 shows a partial perspective view of a lens cover of the lighting fixture according to a third embodiment.

In this embodiment, the tab 3 of the lens cover 110 has a wave-shaped structure, with multiple ridges 16 and multiple troughs 17 formed alternately, as shown in FIG. 10. During the process of inserting the tab 3 into the slot 4, an outer side surface of each ridge 16 of the tab 3 and an outer side surface of the slot 4 squeeze each other, and an inner side surface of each trough 17 of the tab 3 and an inner side surface of the slot 4 squeeze each other, so as to realize an interference fit between the tab 3 and the slot 4, thereby securing the lens cover 110 to the housing 120. The other side 16' of the ridges 16 and the other side 17' of the troughs 17 are not in contact with the slot 4, which allows deformation of the tab 3.

Fourth Embodiment

The lighting fixture 100 of this embodiment substantially has the same structure as the lighting fixture 100 of the first embodiment except for the tab 3. In this embodiment, the same parts as those in the first embodiment are denoted by the same reference numerals, and the description thereof is not repeated.

Figure 11:
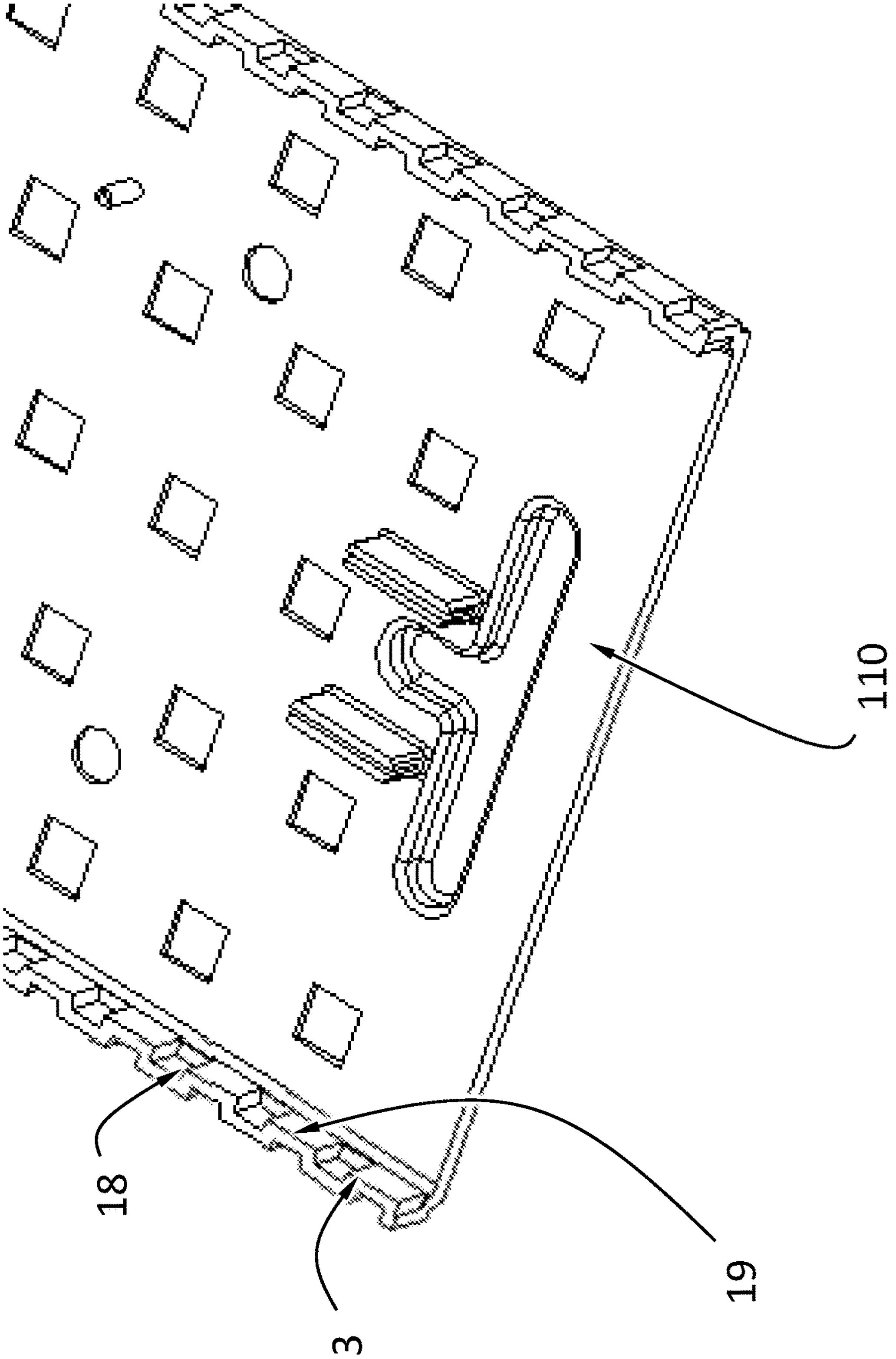
FIG. 11 shows a partial perspective view of a lens cover of a lighting fixture according to a fourth embodiment.

In this embodiment, the tab 3 of the lens cover 110 has a concavo-convex structure, with multiple convex ribs 18 and multiple concave ribs 19 formed alternately, as shown in FIG. 11. During the process of inserting the tab 3 into the slot 4, an outer side surface of each convex rib 18 of the tab 3 and an outer side surface of the slot 4 squeeze each other, and an inner side surface of each concave rib 19 of the tab 3 and an inner side surface of the slot 4 squeeze each other, so as to realize an interference fit between the tab 3 and the slot 4, thereby securing the lens cover 110 to the housing 120. The other side of the convex rib 18 is not in contact with the slot 4, which allows deformation of the tab 3.

Fifth Embodiment

The lighting fixture 100 of this embodiment substantially has the same structure as the lighting fixture 100 of the first embodiment except for the tab 3. In this embodiment, the same parts as those in the first embodiment are denoted by the same reference numerals, and the description thereof is not repeated.

Figure 12:
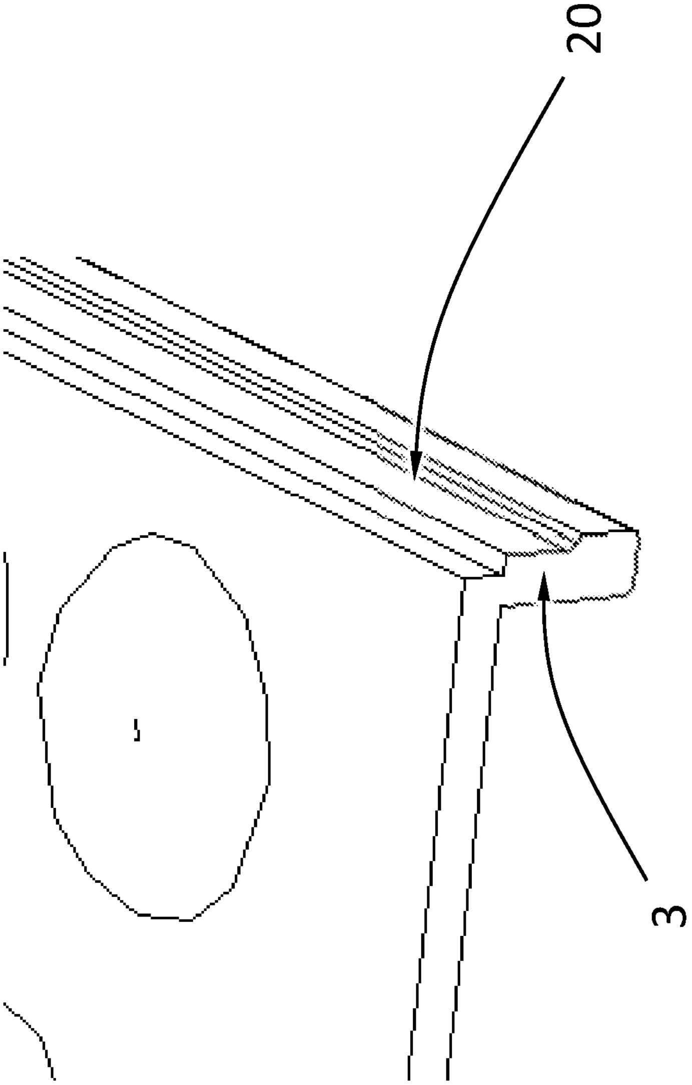
FIG. 12 shows a partial perspective view of a lens cover of a lighting fixture according to a fifth embodiment.
Figure 13:
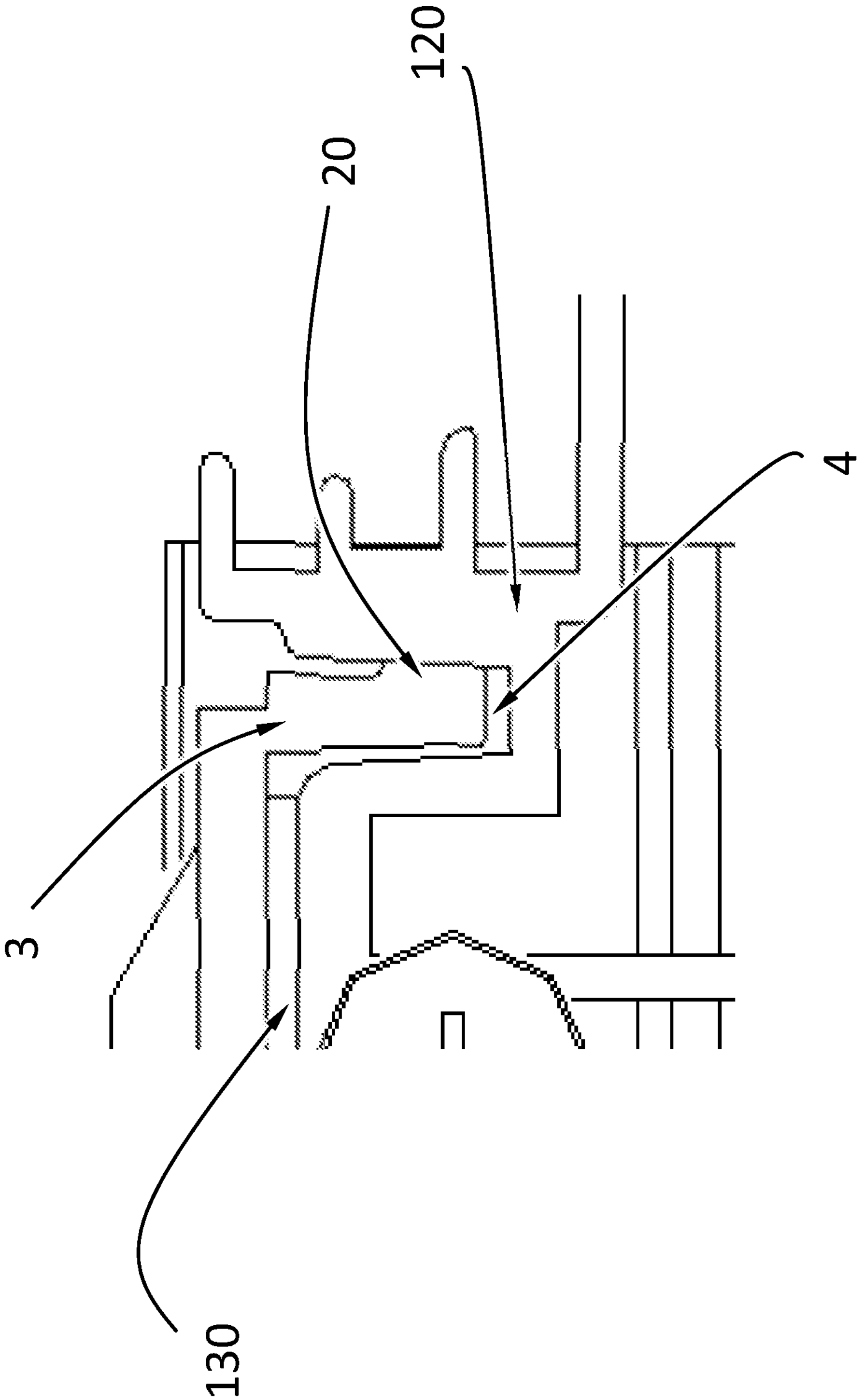
FIG. 13 shows a partial cross-sectional view of the lighting fixture according to the fifth embodiment.

In this embodiment, the bottom end of the tab 3 has an outwardly protruding abutting portion 20, as shown in FIG. 12. During the process of inserting the tab 3 into the slot 4, the tab 3 deforms inwardly, so that it can be smoothly inserted into the slot 4. Then, the elasticity of the tab 3 itself makes the tab have a tendency to reset, forcing the abutting portion 20 to tightly abut against the outer sidewall of the slot 4 as shown in FIG. 13, so as to achieve an interference fit between the tab 3 and the slot 4.

Sixth Embodiment

The lighting fixture 100 of this embodiment substantially has the same structure as the lighting fixture 100 of the first embodiment except for the tab 3 and the slot 4. In this embodiment, the same parts as those in the first embodiment are denoted by the same reference numerals, and the description thereof is not repeated.

Figure 14:
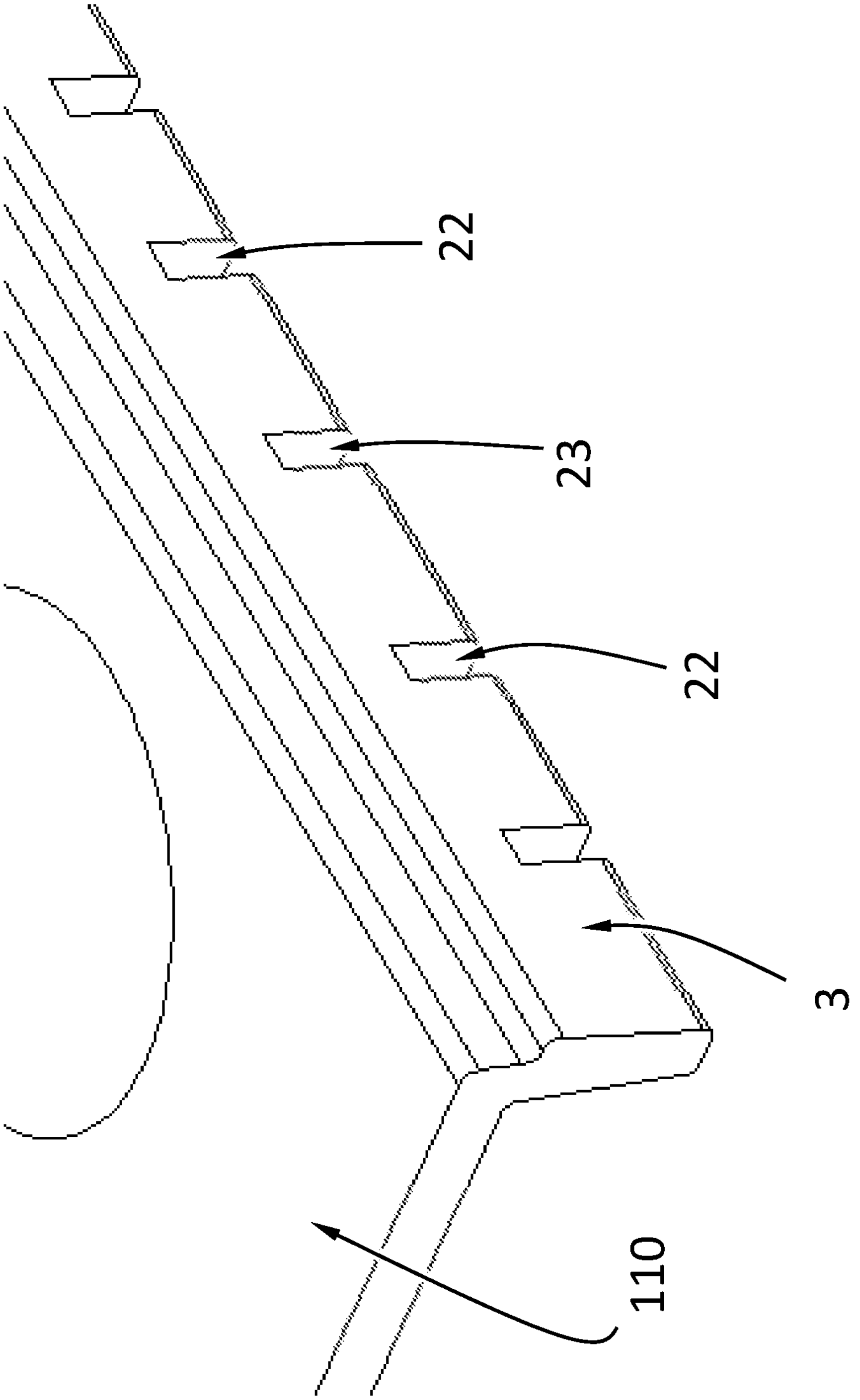
FIG. 14 shows a partial perspective view of a lens cover of a lighting fixture according to a sixth embodiment.
Figure 15:
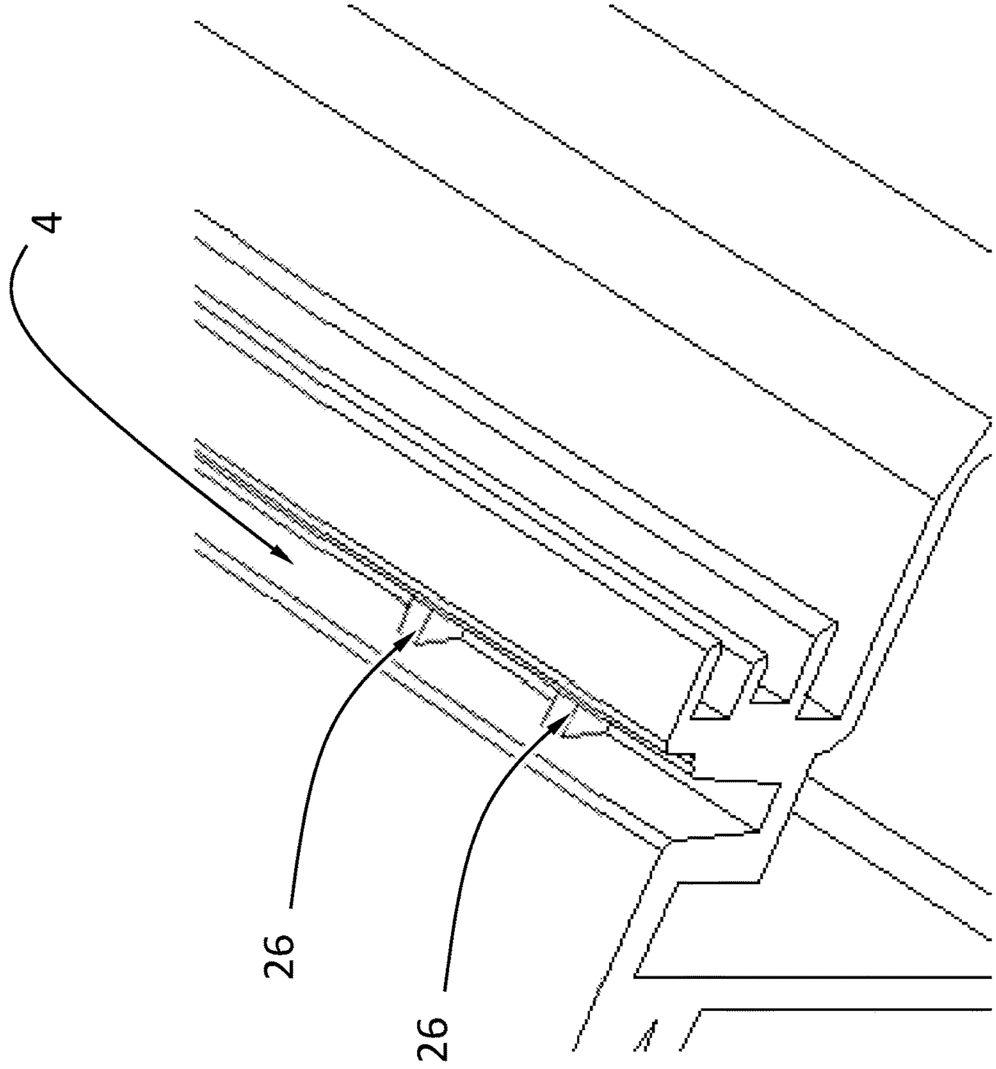
FIG. 15 shows a partial perspective view of a groove in a housing of a lighting fixture according to the sixth embodiment.

In this embodiment, the tab 3 has clamping grooves 22 and avoidance grooves 23 between adjacent clamping grooves 22 as shown in FIG. 14, and the bottom of the slot 4 has a plurality of clamping blocks 26 as shown in FIG. 15. The clamping grooves 22 and the clamping blocks 26 can fit each other in one-to-one correspondence. When the tab 3 is inserted into the slot 4, the clamping blocks 26 are inserted into corresponding clamping grooves 22 to achieve an interference fit between the clamping blocks 26 and the clamping grooves 22. In addition, due to the existence of the avoidance grooves 23, during the process of inserting the clamping blocks 26 into the clamping grooves 22, parts of the tab 3 located on both sides of each clamping groove 22 are squeezed and retreated toward adjacent avoidance grooves 23, facilitating the insertion of the clamping blocks 26 into the clamping grooves 22 to achieve the interference fit.

The number of the clamping grooves 22 or the number of the clamping blocks 26 can be set according to actual needs and is not limited in the preset disclosure. In addition, it is also possible to omit the avoidance grooves 23.

Seventh Embodiment

The lighting fixture 100 of this embodiment substantially has the same structure as the lighting fixture 100 of the first embodiment except for the tab 3. In this embodiment, the same parts as those in the first embodiment are denoted by the same reference numerals, and the description thereof is not repeated.

Figure 16:
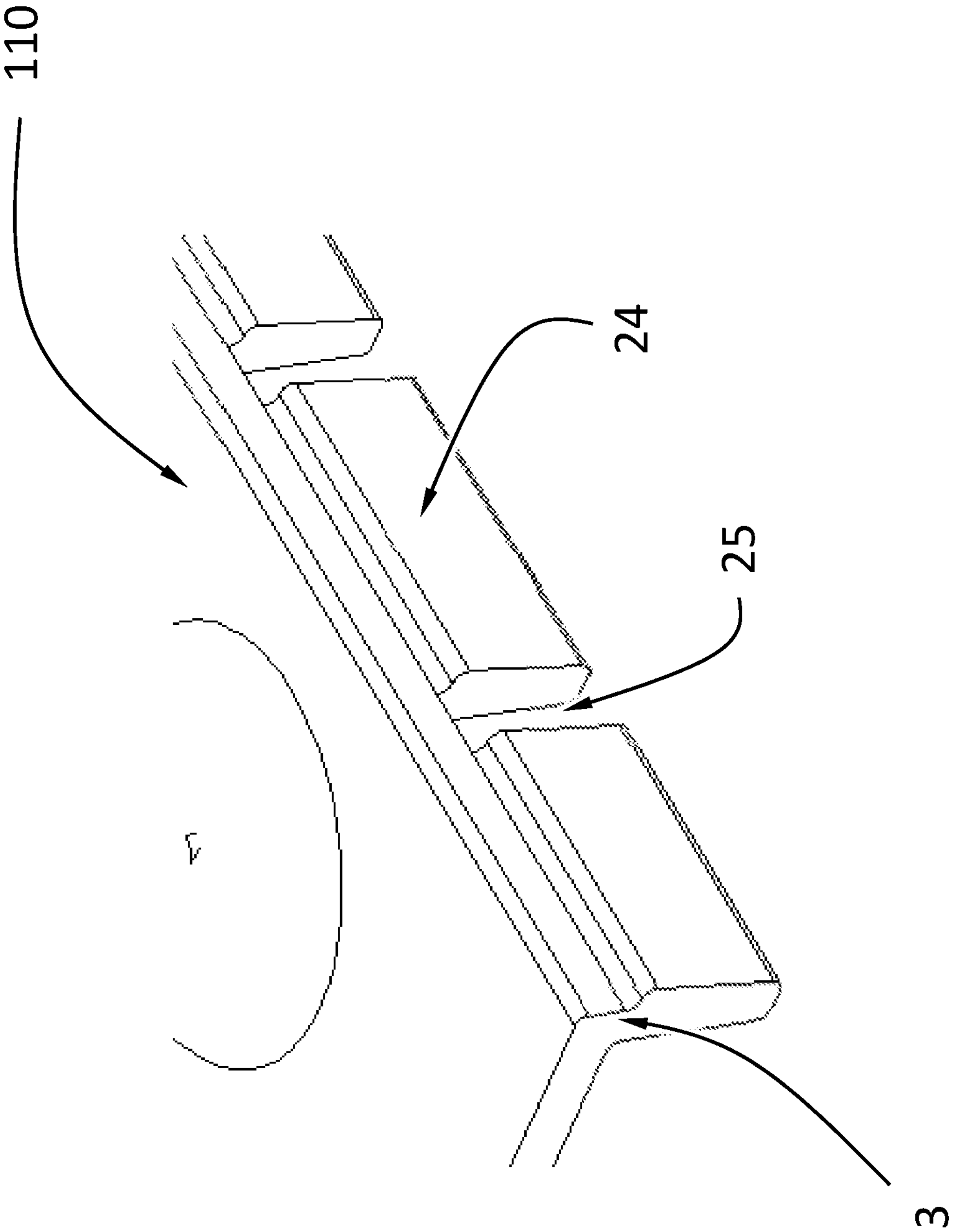
FIG. 16 shows a partial perspective view of a lens cover of a lighting fixture according to a seventh embodiment.
Figure 17:
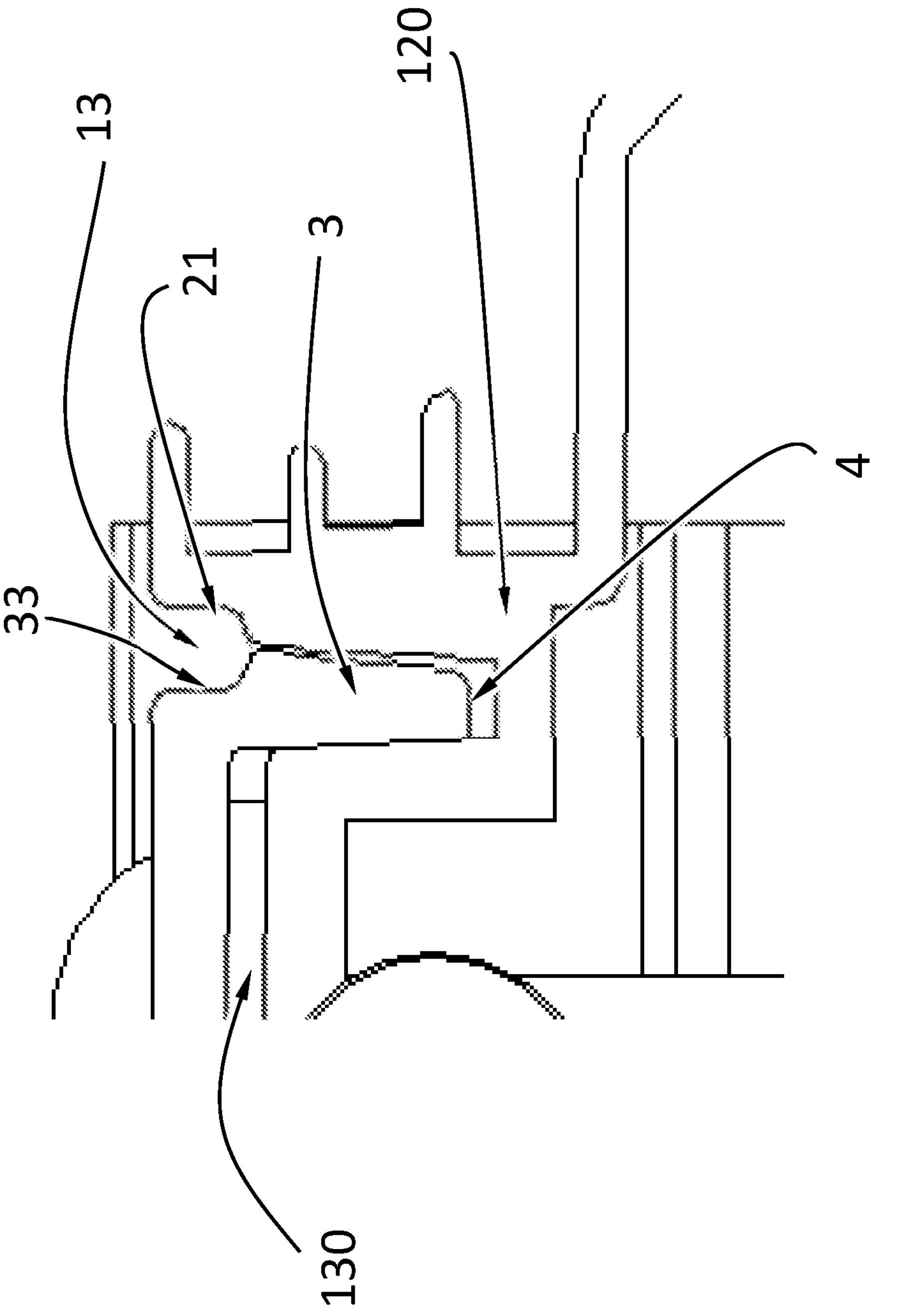
FIG. 17 shows a partial cross-sectional view of a lighting fixture according to the seventh embodiment.
Figure 18:
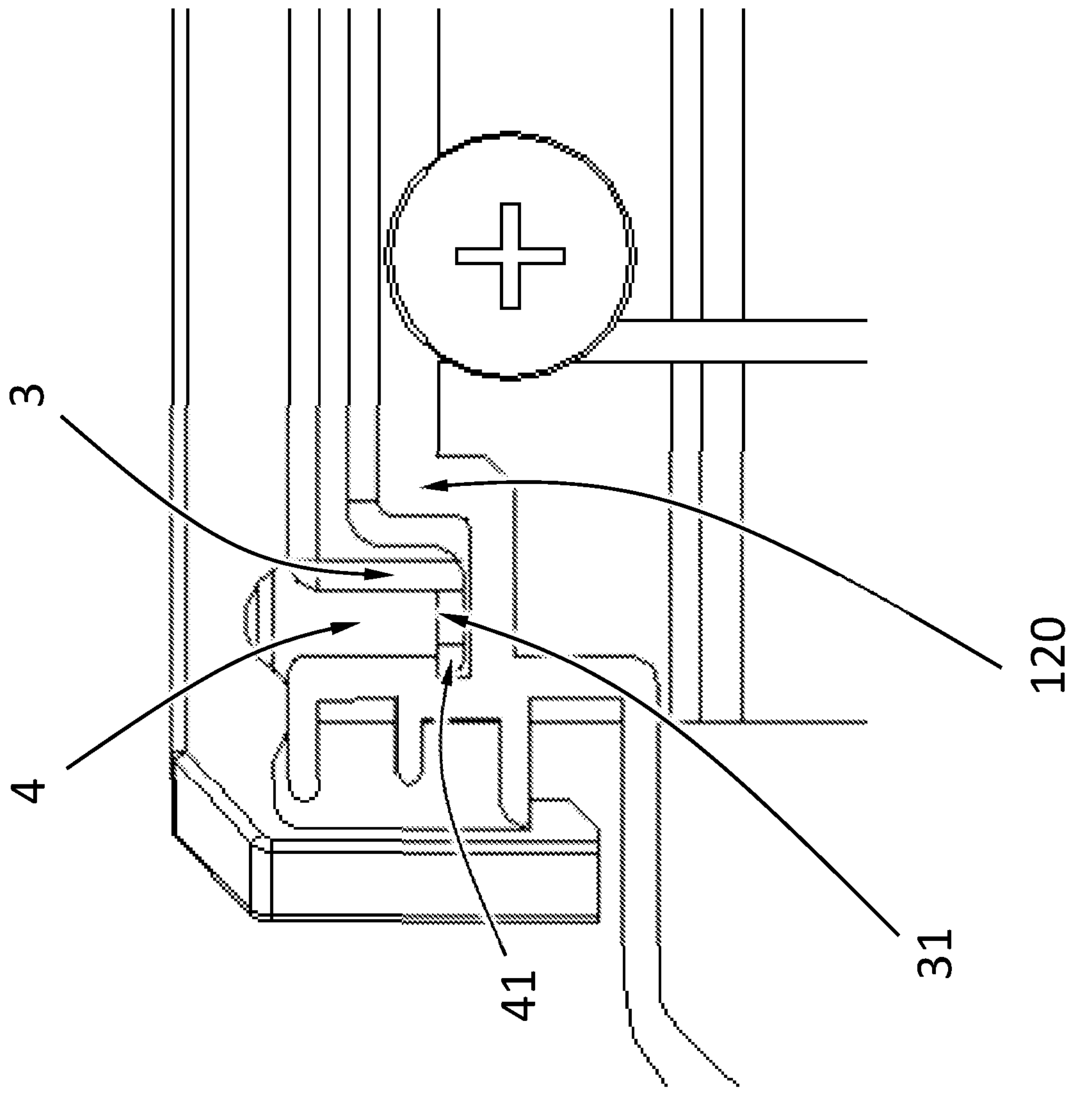
FIG. 18 shows a partial cross-sectional view of a lighting fixture according to an eighth embodiment.

In this embodiment, the tab 3 has multiple insert sections 24 and multiple gaps 25 between adjacent insert sections 24 as shown in FIG. 16. During the process of inserting the tab 3 into the slot 4, the insert sections 24 are inserted into the slot 4 to achieve an interference fit between the insert sections 24 and the slot 4. Since the tab 3 has the multiple insert sections 24 and the multiple gaps 25 arranged alternately instead of an integral structure, the elasticity of the tab 3 is better, which is easy to disassemble and assemble, and is also convenient for subsequent maintenance.

In addition, the top of each insert section 24 may further be provided with a first recessed portion 33, and the top of the slot 4 may further be provided with a second recessed portion 21. When the flanging 3 is inserted into the slot 4, the first recessed portion is directly opposite to the second recessed portion 21 to form a groove 13. In a specific implementation of this embodiment, the bottom of the slot 4 may be filled with a first sealant before the tab 3 is inserted into the slot 4, and the groove 13 may be filled with a second sealant after the tab 3 is inserted into the slot 4. Since there are gaps 25 between adjacent insert sections 24, when the second sealant is filled in the groove 13, the sealant can flow from the gaps 25 into the bottom of the slot 4 to fix the insert sections 24.

Eighth Embodiment

The lighting fixture 100 of this embodiment substantially has the same structure as the lighting fixture 100 of the first embodiment except for the tab 3 and the slot 4. In this embodiment, the same parts as those in the first embodiment are denoted by the same reference numerals, and the description thereof is not repeated.

In this embodiment, the bottom end of the tab 3 has an outwardly extending hook 31, and a buckle groove 41 is provided in a sidewall of the slot 4. When the tab 3 is inserted into the slot 4, the hook 31 engages the buckle groove 41 to achieve a snap fit between the tab and the slot 4. Moreover, after the tab 3 is inserted into the slot 4, a sealing strip may be inserted between the tab 3 and the sidewall of the slot 4 in the slot 4, or a sealant may be filled in the slot 4.

The buckle groove 41 may be located on the outer sidewall of the slot, which reserves an operating space for inserting the sealing strip and/or filling the sealant. One sidewall of the buckle groove 41 may be coplanar with the bottom wall of the slot 4, so that the hook 31 can be directly arranged on the edge of the tab 3, thereby reducing the difficulty of lens design, thereby reducing the manufacturing cost of the lighting fixture.

Other Embodiments

In various embodiments described previously, the lighting fixture has a cuboid shape as shown in FIG. 2. The lighting fixture may also have other shapes such as a cylinder, a sphere, a semi-sphere, a cone or a dome. That is, in the present disclosure, the shape of the lighting fixture is not limited to those illustrated in the various embodiments.

In the various embodiments, the housing of the lighting fixture is provided with two slots on its opposite sides based on the cuboid shape of the lighting fixture. In another embodiment, the lighting fixture has a cylinder shape, and only one slot is provided on a peripheral side of the housing, so that the lens cover can be secured to the housing.

Further, the tab of the lighting fixture is described as having a wave-shaped structure and a concavo-convex structure in the third and fourth embodiments, respectively. Other corrugated structures with a series of alternating ridges and troughs, such as a zigzag or saw-tooth structure may be possible.

The embodiments presented herein are meant to be exemplary. Embodiments of the present disclosure can comprise any combination of compatible features shown in the various figures, and these embodiments should not be limited to those expressly illustrated and discussed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A lighting fixture, comprising a housing, a circuit board and a lens cover, wherein:

the housing and the lens cover are on opposite sides of the circuit board;

the housing comprises a first slot;

the lens cover comprises a first tab configured to fit into the first slot by a threadless fit, thereby securing the lens cover to the housing;

wherein the lighting fixture further comprises a first sealant in the first slot, and a first groove defined by an outer sidewall of the first tab and an outer sidewall of the first slot, with a second sealant in the first groove.

2. The lighting fixture of claim 1, wherein the threadless fit is an interference fit.

3. The lighting fixture of claim 1, wherein the threadless fit is a snap fit.

4. The lighting fixture of claim 1, wherein the housing further comprises a second slot, and the lens cover further comprises a second tab configured to fit into the second slot by a threadless fit.

5. The lighting fixture of claim 1, wherein the first tab comprises a groove with an opening toward a bottom of the first slot.

6. The lighting fixture of claim 1, wherein an opening of the first slot has a greater width than a bottom of the first slot.

7. The lighting fixture of claim 1, wherein the first sealant is different from the second sealant.

8. The lighting fixture of claim 7, wherein the first sealant has a higher viscosity than the second sealant.

9. The lighting fixture of claim 1, wherein the first tab has a first taper, and the first slot has a second taper greater than the first taper.

10. The lighting fixture of claim 4, wherein the housing further comprises a third slot between the first slot and the second slot, and the lens cover further comprises a third tab configured to fit into the third slot by an interference fit or a snap fit, thereby securing the lens cover to the housing.

11. The lighting fixture of claim 1, wherein the lens cover comprises one or more positioning columns, the housing comprises one or more positioning holes, and the positioning columns are configured to position the lens cover relative to the housing by fitting into the positioning holes.

12. The lighting fixture of claim 1, wherein the first tab has an asymmetrical taper.

13. The lighting fixture of claim 1, wherein the first tab comprises a groove with an opening toward an opening of the first slot.

14. The lighting fixture of claim 1, wherein the first tab is corrugated, with ridges on an outer sidewall and troughs on an inner sidewall of the first tab, and the ridges engage the first slot.

15. The lighting fixture of claim 1, wherein the first tab comprises a protrusion on an outer sidewall of the first tab, and the protrusion engages the first slot.

16. The lighting fixture of claim 1, wherein the first tab comprises a plurality of clamping slots, the first slot comprises a plurality of clamping blocks, and the plurality of clamping slots engage the plurality of clamping blocks, thereby forming an interference fit.

17. The lighting fixture of claim 1, wherein the first tab comprises a plurality of gaps.

18. The lighting fixture of claim 17, wherein the first tab comprises a plurality of sections, and the plurality of gaps and the plurality of sections are alternately arranged.

19. The lighting fixture of claim 3, wherein the first tab comprises a hook, the first slot comprises a buckle groove in a sidewall of the first slot, and the hook engages the buckle groove, thereby forming the snap fit.

20. The lighting fixture of claim 1, wherein the lens cover comprises a plurality of lenses.

21. The lighting fixture of claim 1, wherein the circuit board comprises light emitters arranged in an array.

22. The lighting fixture of claim 1, wherein the housing comprises a heat sink.

23. The lighting fixture of claim 20, wherein each of the plurality of lenses covers a predetermined number of light emitters in the circuit board and is configured to direct light emitted from the light emitters out of the lighting fixture.

24. The lighting fixture of claim 10, wherein the third tab is in a light-emitting region of the lighting fixture.

* * * * *